MRS. MARY JANE LAIRD, OF MIDDLETOWN, PENNSYLVANIA, ADMINISTRATRIX OF THE ESTATE OF ANDREW J. LAIRD, DECEASED.

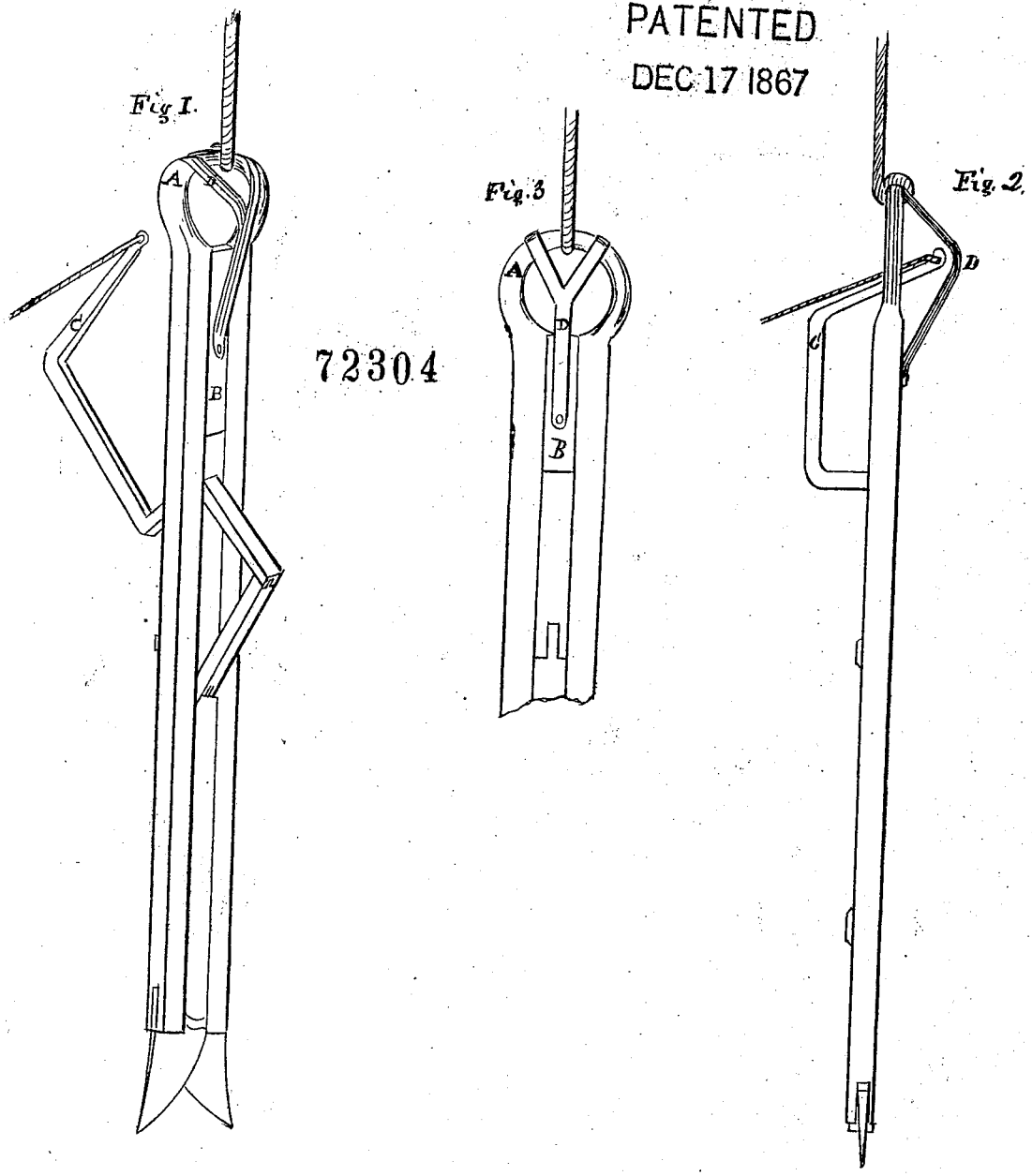

Letters Patent No. 72,304, dated December 17, 1867.

IMPROVEMENT IN HORSE HAY-FORKS.

The Schedule referred to in these Letters Patent and making part of the same.

TO WHOM IT MAY CONCERN:

Be it known that I, MARY JANE LAIRD, of Middletown, in the county of Dauphin, State of Pennsylvania, being administratrix on the estate of ANDREW J. LAIRD, late of said Middletown, who invented and put in use an important improvement to his hay-fork, patented August 21, 1866, do hereby declare the following to be a full and exact description of the same, reference being had to the drawings that accompany and form a part of these specifications.

Figure 1, perspective view of hay-fork with guard attached.

Figure 2, hay-fork with the guard, showing the position of the lever when raising the hay.

Figure 3, view of guard, showing the form or shape.

Letter A, ring or loop, to which the hoisting-rope is attached; letter B, shank or bars, sustaining the tines and lever; letter C, lever by which the tines or blades are operated; letter D, guard, to protect the lever C.

The object of this invention is to protect the end of the lever, where it projects through the ring A, from striking against anything while raising the hay, and thus unshipping the load before you desire to.

The upper part of the lever C, it will be seen, is a horizontal arm, which projects through the ring A when the tines are in position to lift the hay, as seen in fig. 2. The drawings will, perhaps, sufficiently show the manner of construction. It is made in the form of three braces, united in the centre, as shown in fig. 3. The two upper ends are riveted, one on each side, near the top of the ring A, and the other end to the shank or bar B.

What is claimed, and desired to be secured by Letters Patent, is—

The guard D, when applied to hay-forks for the protection of the lever or arm, substantially as described and set forth.

In testimony whereof, I have signed my name to this specification in the presence of two subscribing witnesses.

MRS. MARY JANE LAIRD,
*Administratrix of the Estate of the said Andrew J. Laird.*

Witnesses:
B. S. PETERS,
JOHN LORESH.